US006065127A

United States Patent [19]
Aizenberg et al.

[11] Patent Number: 6,065,127
[45] Date of Patent: May 16, 2000

[54] MULTI-MODE BUFFER FOR DIGITAL SIGNAL PROCESSOR

[75] Inventors: Yair Aizenberg, Tinton Falls; Daniel Amrany, Ocean, both of N.J.

[73] Assignee: Globespan Semiconductor, Inc., Red Bank, N.J.

[21] Appl. No.: 09/152,441

[22] Filed: Sep. 14, 1998

Related U.S. Application Data

[60] Provisional application No. 60/075,935, Feb. 25, 1998.

[51] Int. Cl.[7] .................................................. G06F 13/38
[52] U.S. Cl. ............................................ 713/401; 710/52
[58] Field of Search ............................. 713/401; 710/52, 710/58–61

[56] References Cited

U.S. PATENT DOCUMENTS

| | | | |
|---|---|---|---|
| 3,896,417 | 7/1975 | Beecham | 710/61 |
| 4,785,415 | 11/1988 | Karlquist | 713/401 |
| 5,235,682 | 8/1993 | Mitsuhira et al. | 710/60 |
| 5,285,116 | 2/1994 | Thaik | 326/21 |
| 5,313,501 | 5/1994 | Thacker | 375/369 |
| 5,444,406 | 8/1995 | Horne | 327/277 |
| 5,757,873 | 5/1998 | Hunt | 375/373 |
| 5,845,314 | 12/1998 | Ishida | 711/104 |

*Primary Examiner*—Thomas M. Heckler
*Attorney, Agent, or Firm*—Thomas, Kayden, Horstemeyer & Risley

[57] ABSTRACT

The present invention is generally directed to a multi-mode buffer that is configurable to control output delivered to an input, with a variable clock cycle delay. For example, the buffer may be controlled, in one mode to deliver input data to an output, at a one clock cycle delay (i.e., output data at next clock edge). In another mode, the buffer may be controlled to deliver input data to an output, at a two clock cycle delay. In accordance with one aspect of the present invention, the buffer includes a clock input, a data input, a control input, and an output. The input and the output may be of variable bit width. For example, 8 bits, 16 bits, or some other bit width. The buffer further includes circuitry for delivering data on the data input to the output in response to the clock input. In this regard, the buffer includes circuitry responsive to the control input to vary a delay in delivering the data input to the output, such that the delay may be one clock cycle, two clock cycles, or some other desired length.

18 Claims, 5 Drawing Sheets

MULTI-MODE BUFFER FOR DIGITAL SIGNAL PROCESSOR

CROSS-REFERENCE TO RELATED APPLICATIONS

This application claims the benefits of U.S. Provisional Patent Application Ser. No. 60/075,935, filed Feb. 25, 1998, and entitled Dual Mode Buffer, which is hereby incorporated by reference.

BACKGROUND OF INVENTION

1. Field of the Invention

The present invention generally relates to digital signal processors, and more particularly to a multi-mode buffer for a digital signal processor.

2. Discussion of the Related Art

As is known, digital signal processors (DSPs) are used in a wide variety of practical applications. Although circuit architectures may vary from chip to chip, DSPs are generally characterized by a multiplier component. As is known, multipliers perform the multiplication operation at an extremely high rate of speed (often within a single clock cycle). In comparison, a typically microprocessor architecture, which contains shifters adders and accumulators, performs a number of shift, add, and accumulate operations to carry out a single multiplication operation. This manner of performing a single multiplication operation requires a relatively large number of clock cycles. As a result, arithmetic computations requiring many multiplication operations are preferably performed with a DSP.

As merely one example, DSP chips are used in electronic communications, and virtually all modems include an on-board DSP chip. As is known by those skilled in the communications art, the coding, filtering, error-correction, and other processes associated with electronic communications all demand relatively extensive mathematical computations. In order to achieve the desired speed for communications—and the faster, the better—DSP chips are used to perform this processing.

Figure 1:
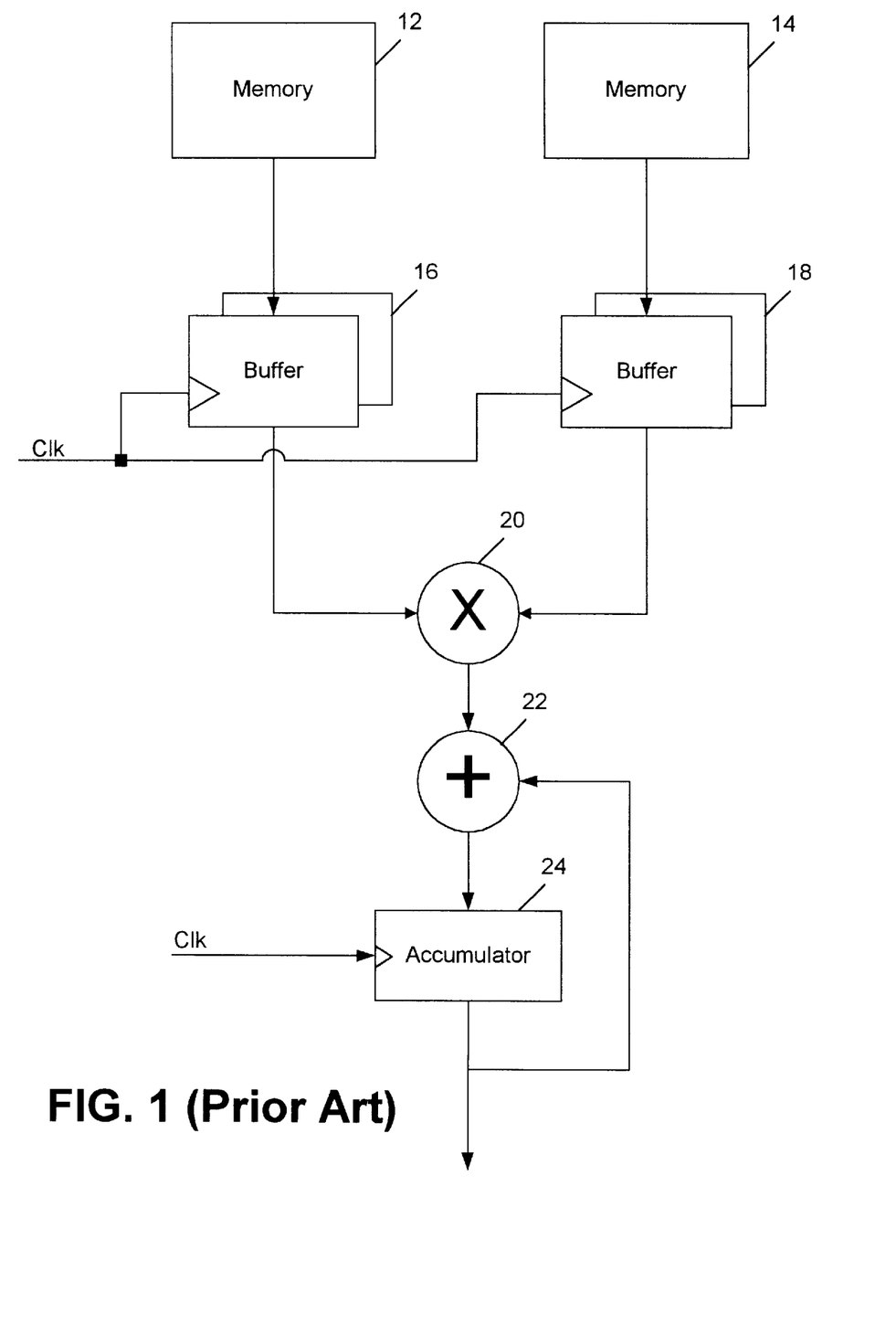
FIG. 1 is a block diagram illustrating primary components of a digital signal processing (DSP) chip, as is known in the prior art.

To facilitate this discussion, reference is made to FIG. 1, which illustrates a very basic DSP architecture, as is known in the prior art. As will be appreciated by those skilled in the art, many other processing and control elements are present in an actual DSP chip. However, only those relevant to the illustration of the present invention have been depicted herein.

In the microprocessor art, the Harvard architecture has been well known for years. This Harvard architecture employs two separate memory devices: one memory for storing instructions, and one memory for storing data. A similar architecture is typically employed in DSP architectures, wherein one memory is used to store date and one memory is used to store coefficients. More specifically, when repeatedly calculating equations of the form:

output=coefficient×data, one memory 12 is configured to store coefficient values and the other memory 14 is used to store data values. In this regard, the bit length of the coefficient values is often different that the bit length of the data values. Thus, for example, the coefficient memory 12 may be n bits in size (data path) and the data memory 14 may be n bits in size. In such an architecture, however, it is important to synchronize or coordinate the storage and retrieval of data and coefficient values to and from the respective memories.

Registers or buffers 16 and 18 are disposed in communication with the memories 12 and 14, such that data read out from the memories 12 and 14 may be clocked into the buffers 16 and 18. A multiplier 20 is configured to multiply the output values of the buffers 16 and 18. Then, an adder 22 and accumulator 24 combination sums the values successively output from the multiplier 20. In this regard, the adder 22 is typically an asynchronous device, and the accumulator is a registered device (although the may be combined into a single registered adder). Since an accumulated value is fed back to the adder, registering the summed value allows for controlled addition (without the fed back value over accumulating).

Therefore, a simple multiplication operation on this type of architecture may be carried out in the sequence set forth immediately below.

| Clk Cycle | Instruction(s) |
|---|---|
| 1 | fetch(coefficient); fetch(data) |
| 2 | coefficient$^{real}$ × data$^{real}$ |
| 3 | coefficient$^{imaginary}$ × data$^{real}$ |
| 4 | coefficient$^{real}$ × data$^{imaginary}$ |
| 5 | coefficient$^{imaginary}$ × data$^{imaginary}$; fetch(coefficient); fetch(data) |
| . | . |
| . | . |
| . | . |

In the first clock cycle, data may be fetched (or loaded) from the memory devices 12 and 14 into the buffers 16 and 18. Then, the multiplication operation is carried out. Since arithmetic computations of ten involve numbers having both real and imaginary components, the example used herein illustrates the computation accordingly. In this regard, the buffers 16 and 18 are illustrated in groups of two, wherein one buffer (of each pair) may carry the real component and the other may carry the imaginary component. Alternatively, the buffer may simply be large enough to hold both values. For example, a sixteen bit buffer, wherein the first eight bits hold the real component and the last eight bits hold the imaginary component. As is known, this multiplication of two complex numbers actually requires four separate multiplication operations, as shown above. Then, commensurate with the last multiplication operation, the data and coefficient values for the next multiplication operation may be read into the buffers.

It has been found that this prior art structure does, however, suffer various shortcomings. For example, if the two memories share a common address bus and data bus, it will take longer to read the data and coefficient values into the memories, since the must be written to one at a time. Alternatively, if the memories are designed on separate address and data busses, the circuitry for controlling the loading and operations becomes more complex, as separate address and control logic must be employed, then synchronized with each other to insure that the data and coefficient values are stored and read appropriately.

Accordingly, there is a need to provide an improved DSP architecture that overcomes these and other related shortcomings of the prior art.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a multi-mode buffer that is configurable to controllably output delivered to an input, with a variable clock cycle delay. For example, the buffer may be controlled, in one mode to deliver input data to an output, at a one clock cycle delay (i.e., output data at next clock edge). In another mode, the buffer may be controlled to deliver input data to an output, at a two clock cycle delay. In accordance with one aspect of the present invention, the buffer includes a clock input, a data input, a control input, and an output. The input and the output may be of variable bit width. For example, 8 bits, 16 bits, or some other bit width. The buffer further includes means for delivering data on the data input to the output in response to the clock input. In this regard, the buffer includes means responsive to the control input to vary a delay in delivering the data input to the output, such that the delay maybe one clock cycle, two clock cycles, or some other desired length.

In accordance with the preferred embodiment of the present invention, the control input is a one bit input and the buffer is operative to deliver data at the data input to the output in a one clock cycle delay, when the control input is a logic zero value. Conversely, when the control input is a logic one value, the buffer is operative to deliver data to the data output in a two clock cycle delay.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

Figure 2:
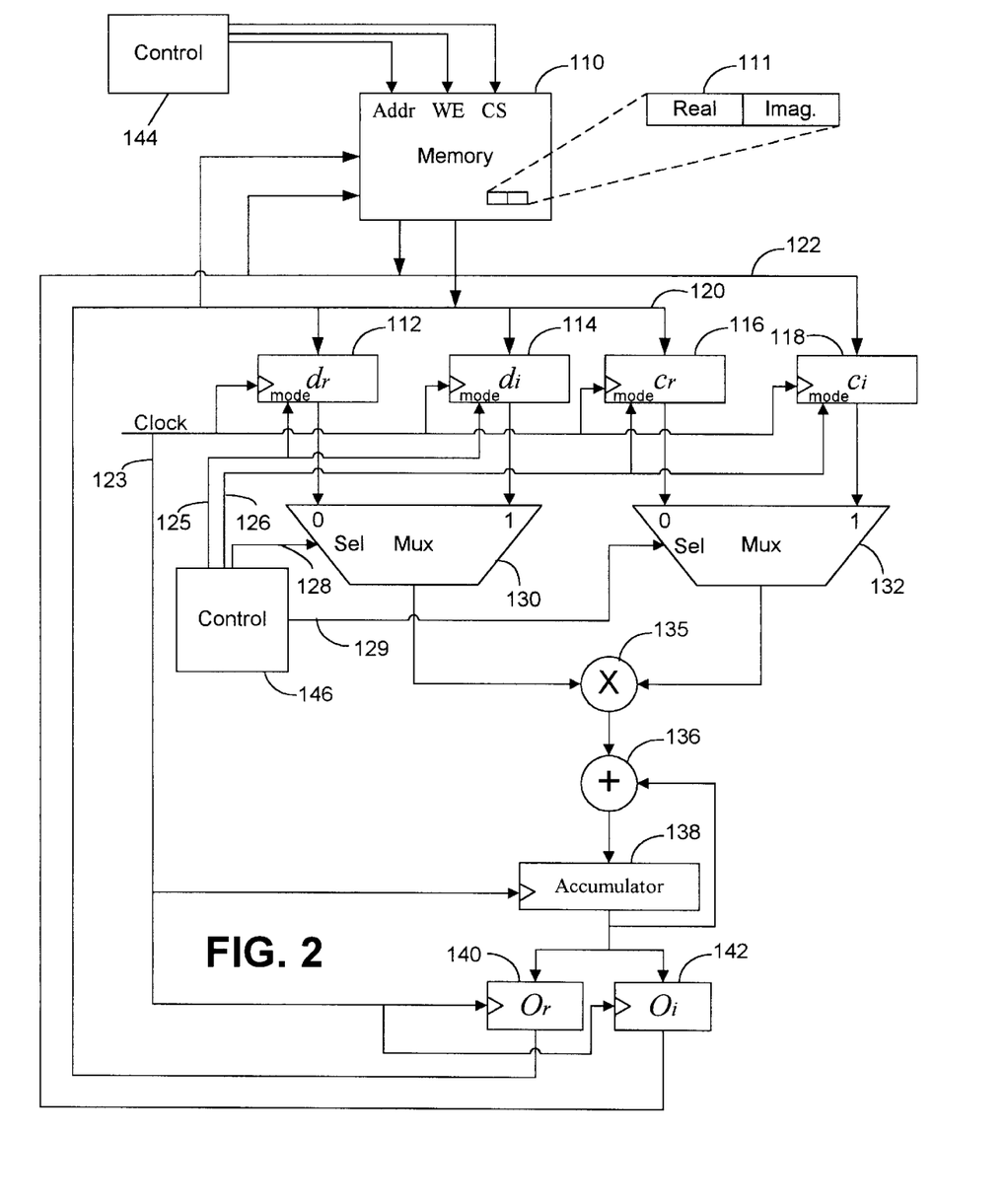
FIG. 2 is a block diagram illustrating the fundamental components of a DSP core constructed in accordance with the present invention.

Turning now to the drawing referenced is made to FIG. 2, which shows the primary components of a digital signal processing chip, similarly to that of FIG. 1, but utilizing a single memory element 110. Although there will be various ways of storing data elements within the memory 110, in one method, each memory location may be effectively partitioned into both real and imaginary components 111. In this regard, a dual word memory device may be utilized, whereby the first word at a given location stores a real component and the second word at a given location stores the imaginary component. Data, in turn, is read from the memory device 110 into buffers 112, 114, 116, and 118, each constructed in accordance with the present invention.

In the preferred embodiment, the DSP chip architecture may be laid out such that it defines real and imaginary buses 120 and 122. Similarly, data may be read from memory 110 on to the real and imaginary buses 120 and 122. As will be described in more detail in connection with FIG. 3, the buffers 112, 114, 116, and 118 are designed to behave like registers that are either one clock cycle or two clock cycles deep. Stated another way, data provided at the input of each buffer will be propagated through to the output of each buffer following the rising edge of the clock signal, when configured as a one clock cycle deep register. Alternatively, when configured as a two clock cycle deep register, the data provided at the input of the registers will be propagated to the output following the second clock cycle.

To better illustrate the purpose behind this design, consider the multiplication of two values, a data value $d(n)$ and a coefficient $c(n)$, where in both the data value d and the coefficient C comprise real and imaginary components (i.e., $d(n)=d_r(n)+d_i(n)$). Since the memory device 110 is configured to output data onto the buses of 120 and 122, it takes two successive clock cycles to write out the data value and the coefficient value (one for the data value and one for the coefficient value). Thus, the real and imaginary components of the data value may, for example, be read out of the memory 110 in a first clock cycle and the real and imaginary components of the coefficient value may be read out of the memory 110 in the following clock cycle. In this scenario, it will be desirable to configure the buffers 112 and 114 (which hold the data value) as a two clock cycle deep buffer, whereas the buffers 116 and 118 (which hold the coefficient value) will be configured as a one clock cycle deep buffer. In this way, data will be read from the memory 110 into buffers 112 and 114 during a first clock cycle. Then, a coefficient will be read from the memory 110 into buffers 116 and 118 during a second clock cycle. Immediately after the second clock cycle, both the data and coefficient values may be read from the output of buffers 112, 114, 116, and 118.

As illustrated (and as will be further discussed in connection with FIG. 3), each of the buffer elements 112, 114, 116 and 118 has a data input, a clock input, and a mode select input. In a preferred embodiment, each of the buffer elements may also include a write enable input (See FIG. 3) which will have the effect of disabling the operation of the buffers, when desired. The clock signal of each buffer is tied together such that each are synchronized to a master clock 123. The mode select lines, in contrast, may be grouped (although not necessarily) in pairs 125, 126. In this regard, the mode select lines for the buffers 112 and 114 are tied together, and the mode select lines for buffers 116 and 118 are tied together 125. This configuration has been designed in this manner, since the real and imaginary component of data values are managed together 126. That is, the real and imaginary components of both the data values and coefficient values are stored to memory and read from memory at the same time.

Multiplexers 130 and 132 are disposed to receive the outputs of the buffers 112, 114, 116, and 118. More specifically, multiplexer 130 is a two to one multiplexer (i.e., two inputs and one output) designed to receive as inputs, the outputs of buffers of 112 and 114. Likewise multiplexer 132 is design to receive as inputs, the outputs from buffers 116 and 118. As previously mentioned, a multiplication of two complex numbers actually involves four separate multiplication operations: a multiplication of the real components, a multiplication of the imaginary components, and than a cross-multiplication of the real and imaginary components of each. The multiplexers 130 and 132 facilitate this task. For example, when multiplying the real component of the data value (stored in buffer 112) with the real component of the coefficient value (stored in buffer 116) the two multiplexers 130 and 132 are controlled to pass these inputs to there respective outputs, which are then directed to the multiplier 135. It will be readily appreciated that, from the configuration shown, either input to the multiplexer 130 may be multi plied with either input directed to multiplexer 132.

The output of the multiplier 135 is then directed to a adder 136, which adds the product of the multiplication with a value previously stored in an accumulator 138, that is synchronized to the same master clock 123 as the buffer components 112, 114, 116, and 118. The output of the accumulator 138 is then directed to output registers 140 and 142, which controllably place the values stored therein on the real and imaginary buses 120 and 122. Control blocks 144 and 146 are depicted merely for purposes of illustration, and will not be described in detail herein. Instead, it will be appreciated by those skilled in the art that control circuitry must be provided to control the proper operation of the processing circuitry illustrated in FIG. 2. For example, controller 146 will be configured to control the multiplexer select lines 128, 129, as well as, the mode select lines 125, 126 for buffers is 112, 114, 116, and 118. Similarly, control circuitry must be provided in order to perform the addressing, writing enable, chip select, etc.—functions for the memory elements 110. That is, consist with the broader operation for carrying out the mathematics calculations within the DSP chip, specific control must be implemented to control the location and management of data and coefficient values within the memory 110. Likewise, some synchronized control must be exercised among the elements shown in FIG. 2 as well as between the controllers 144 and 146. Since the present invention, however, is more specifically concerned with the structure and operations of the buffers elements 112, 114, 116, and 118, the circuitry involved in implemented in the remainder of the DSP chip, including controllers 144 and 146, need not be described herein.

It will be appreciated from the brief discussion presented above, that a simple fetch and multiplication operation carried out on the architecture of FIG. 2 may be as follows:

| Clk Cycle | Instruction(s) |
| --- | --- |
| 1 | fetch(coefficient) |
| 2 | fetch(data) |
| 3 | $coefficient^{real} \times data^{real}$ |
| 4 | $coefficient^{imaginary} \times data^{real}$ |
| 5 | $coefficient^{real} \times data^{imaginary}$; fetch(coefficient) |
| 6 | $coefficient^{imaginary} \times data^{imaginary}$; fetch(data) |
| 7 | . |
| . | . |
| . | . |
| . | . |

As will be appreciated, the two fetch instructions (e.g., clock cycles 5 and 6) are carried out on two successive clock cycles. During the first clock cycle (e.g., cycle 5), the coefficient data is read from the memory 110 into buffers 116 and 118. During the second clock cycle, the data is read from the memory 110 into buffers 112 and 114. In accordance with an aspect of the invention, the buffers 116 and 118 are configured to provide two clock cycle buffering, thereby delaying the output of this coefficient data until the data is propagated through buffers 112 and 114. Furthermore, the buffer of the present invention allows the two fetch instructions to be carried out in parallel with other, multiplication instructions, so that there are no wasted clock cycles.

Unlike the instruction execution in a dual memory DSP chip, as set forth above in the background, the fetch executions for both the data and coefficient values must be carried out in separate clock cycles. However, do to the two clock cycling buffing provided by the buffers in the present invention, both of these fetch instructions may be pipelined with the multiplication instructions as shown, thereby saving one clock cycle in a single complex multiplication computation.

Figure 3:
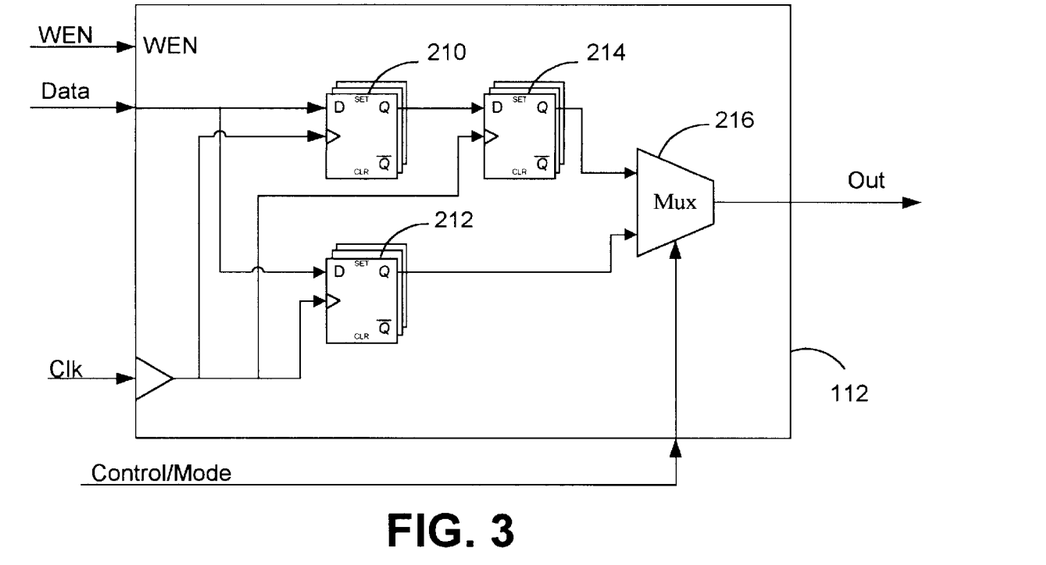
FIG. 3 is a schematic diagram illustrating the logical components of a buffer element constructed in accordance with the present invention.

Referring now to FIG. 3, a schematic diagram is presented that illustrates the logical operation of a buffer 112 constructed in accordance with the present invention. The buffer element 112 includes a data input, a clock input, a write enable (WEN) input, and a control or mode select input. In essence, the buffer 112 operates as though the data input were directed to two D types flip-flops 210 and 212. The output of flip-flop 210 is directed to a successive D flip-flop 214.

Finally, near the output stage a two to one multiplexer 216 is illustrated. The clock input, which is the master clock to the DSP chip, is routed to all three of the D-type flip-flops. Thus, in a manner that can will be appreciated by those having a basic understanding of digital logic, the data that is provided by the input to the buffer 112 is is also provided to the D inputs of flip-flops 210 and 212. Upon receiving the next rising edge of the clock signal, those data values are propagated through the flip-flops 210 and 212. In this way, the data provided at the input of buffer 112, at the next clock cycle, is propagated both to the D input of flip-flop 214 as well as to an input to the multiplexer 216. If the control line or mode select is configured to operate in a one clock cycle deep configuration, then it direct the Q output of flip-flop 212 through the multiplexer 216 and to the output of the buffer 112. Alternatively, if the control line or mode select line is configured to operate the buffer 112 in a two clock cycle deep configuration, then upon receiving the next successive clock pulse the data, which is now at the Q output of flip-flop 210 will be clocked and prorated through flip-flop 214 to the multiplexer 216, whereby it is passed to the output. In addition, a write enable signal (WEN) may be provided to enable or inhibit the operation of the buffer 112.

Figure 4A:
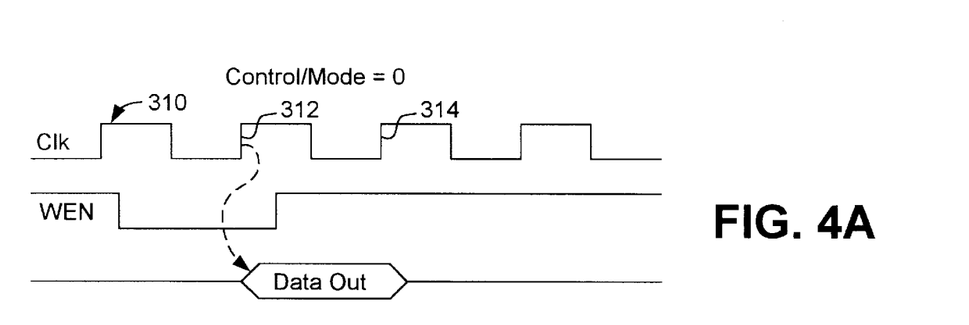
FIGS. 4A and 4B are timing diagrams illustrating the timing operation of the buffer element depicted in FIG. 3.
Figure 4B:
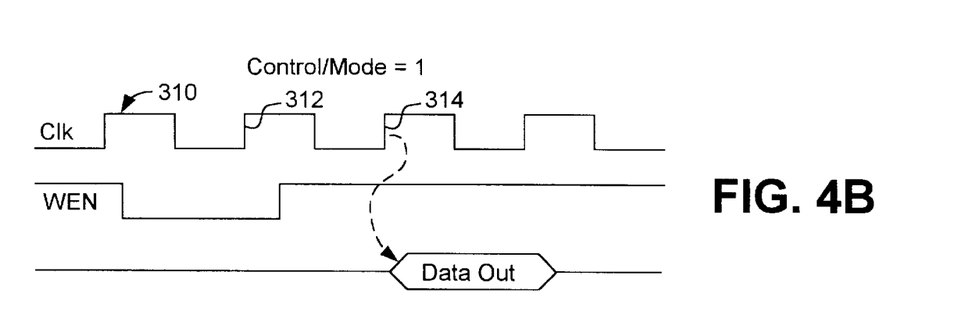

To better illustrate the timing of the operations described above, references now made to FIG. 4A and FIG. 4B which illustrate basic timing, diagrams of the above-described operation. Referring first to FIG. 4A, a timing diagram is illustrated assuming, the control input is equal to zero, indicating a one clock cycle deep operation. A clock signal 310 is illustrated. Assuming a write enable signal (WEN) is provided (active low), the data provided at the input to buffer 112 will be valid at the output shortly following the rising edge 312 of the first clock signal following the enabling of the chip by way of the write enable signal (WEN) going low. Similarly, and as illustrated in FIG. 4B with the control input equal to one, configuring the buffer 112 to operate in a two clock cycle deep configuration, the data will be valid at the output of the buffer immediately following the second rising edge 314 of the clock 310 signal following the transition of the write enable line from high to low (again assuming active low). Of course, consistent with the broad concepts and teaching of the present invention, the flip-flops 210, 212, 214 within the buffer 112 may be configured to trigger off the failing edge of the clock, as opposed to the rising edge of the clock. This, of course, is simply a matter of design choice. What is significant for purposes of the invention, is to provide a buffer 112 that is configurable to operate to delay the input to the output by either one clock or two clock cycles.

The flip-flops 210, 212, and 214 are illustrated in FIG. 3 as stacked or arrayed (e.g., multiple flip flops 210) to represent multi-bit operation. For example, eight flip-flops 210 would be stacked or grouped to accommodate an 8-bit data bus. Alternatively, 16 flip flops would be stacked or grouped to accommodate a 16 bit data bus. In the DSP chip of the preferred embodiment, the data bus is 20 bits wide.

It will be appreciated that the buffer 112 of the present invention is not limited to digital signal processing applications, but may be used in a variety of other devices, where the operation described above is desired.

Figure 5:
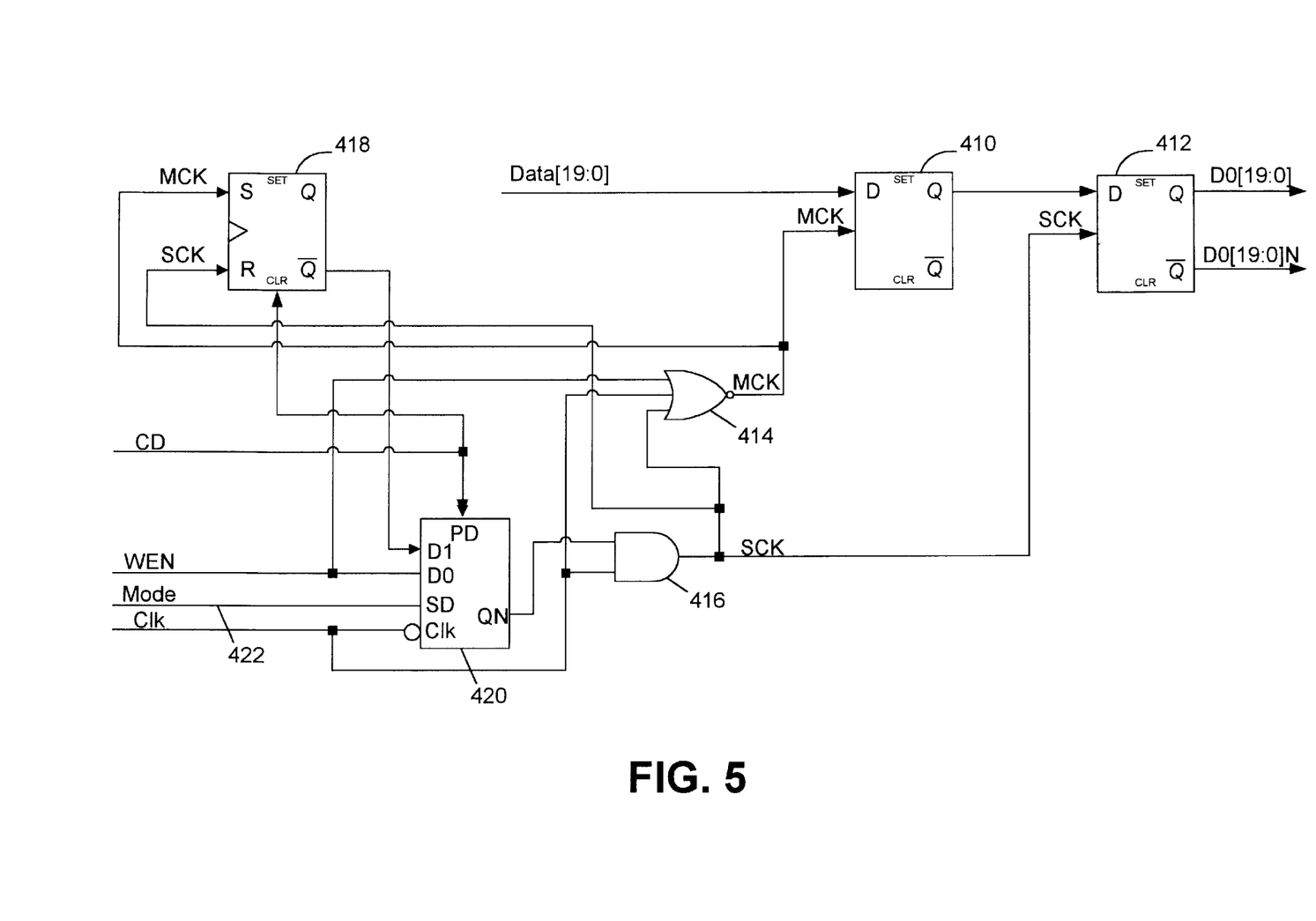
FIG. 5 is a schematic diagram illustrating a buffer element constructed in accordance with the preferred embodiment of the present invention.

Turing now to FIG. 5, a schematic diagram is shown that illustrates actual circuitry of the buffer 112 of the preferred embodiment of the present invention. As mentioned above, FIG. 3 presented a logical diagram of the inventive buffer element, in order to facilitate the description of the inventive concept. An actual implementation of the preferred embodiment, however, of the buffer appears is presented in FIG. 5. Like the illustration depicted in FIG. 3, latches 410 and 412 are cascaded to propagate data input (DATA[19:0]) to the output (DO[19:0]) of the buffer. Although flip-flops (instead of latches) may be used, latches are preferred because they require much less chip area. In the preferred embodiment, the data path is 20 bits wide, and both the data and the data in inverted form are provided at the output. (i.e., DO[19:0] and DO[19:0]N). The write enable line (WEN) and the global or chip clock (Clk) are passed through a three input NOR gate 414 and a two input AND gate 416, as illustrated, to generate a master clock (MCK) and a slave clock (SCK), which clock the latches 410 and 412, respectfully.

Finally, a RS flip-flop 418 and a dual input latch 420 is also utilized. As is known by those in the art, and readily verified by data sheets which are publicly available, the operation of the latch 420 is similar to a conventional D-type flip-flop. However, the flip-flop has two D inputs: DO and D1. The particular D input that is directed to the output is controlled by the select line (SD) which, in accordance with the preferred embodiment, is tied to the mode select or control signal 422. Unlike other latches, however, and as illustrated, the latch 420 is active on the negative level of the clock (Clk). Also, the negative, or inverted outputs of flip-flop 418 and latch 420 are utilized.

Figure 6A:
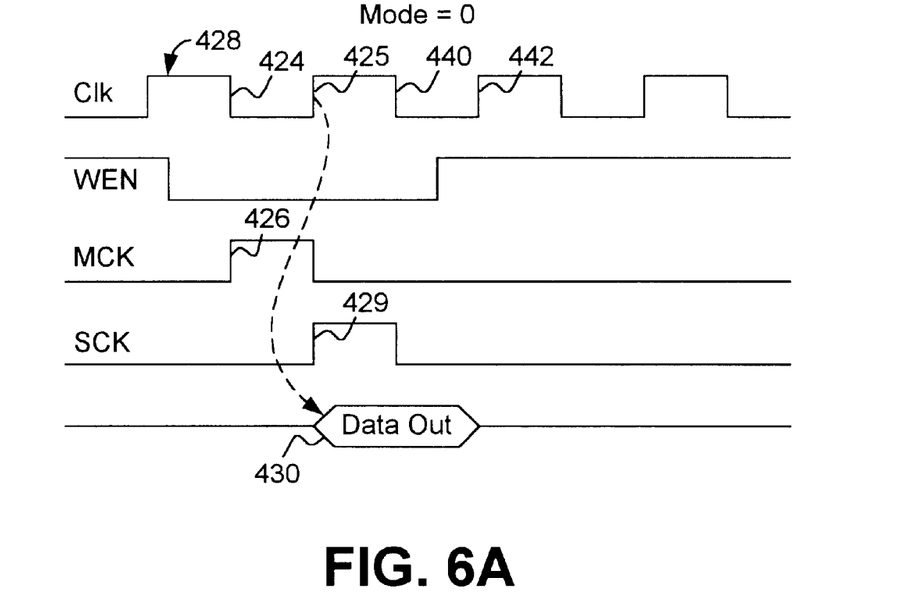
FIGS. 6A and 6B are timing diagrams illustrating the timing operation of the buffer element depicted in FIG. 5.
Figure 6B:
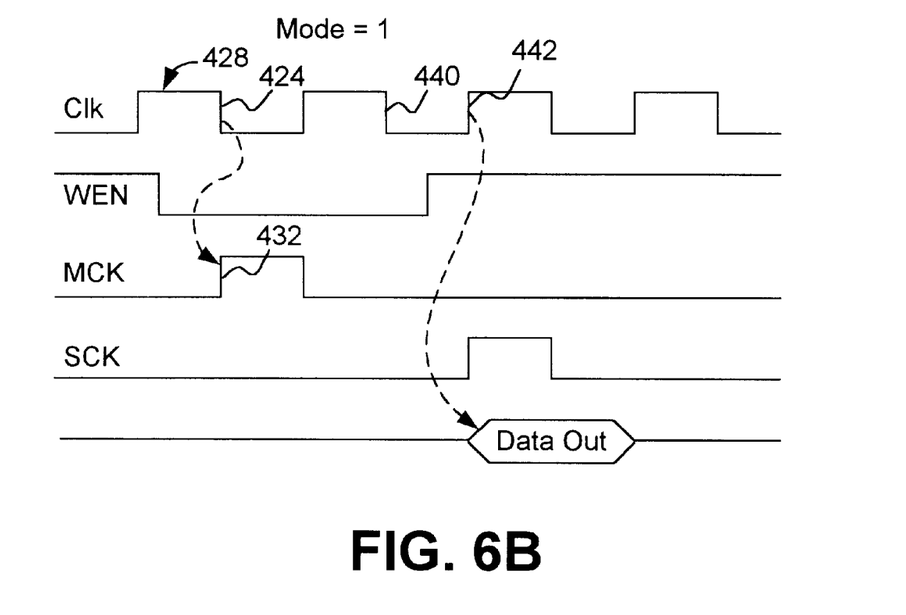

To better illustrate and understand the operation of the circuitry of FIG. 5, reference is made to FIGS. 6A and 6B which are timing diagrams of the circuit operation with the mode signal 422 equal to zero (FIG. 6A) and one (FIG. 6B). With the mode signal 422 equal to zero, the latch 420 directs the write enable (WEN) signal to its output, at the negative level of the clock. Referring to the timing diagram of FIG. 6A, when the write enable line (WEN) goes to zero, the inverted output of latch 420 goes to one at the next negative going edge 424 of the clock signal. At this time, the write enable line (WEN), the clock signal, and the output of end gate are all zero's thus causing the master clock (MCK) output from NOR gate 414 to transition from low to high 426. Since the inverted output of latch 420 is a one, the slave clock (SCK) output from the AND gate 416 transitions from zero to one 429 at the next rising edge 425 of the clock signal (Clk) 428. As described above, immediately following this transition, the data from the input of the buffer propagates to the output. As is seen, in accordance with this timing, the data output becomes valid 430 immediately following the first low to high transition 425 of the clock signal (Clk) following the enabled of the wright enable signal (WEN).

In contrast, and as is reflected FIGS. 6B, when the mode signal 422 is a one, then the latch 420 propagates the D1 signal line, which originates from the Q output of flip-flop 418. As long as the write enable line (WEN) is a one (i.e., disabling the chip) the master (MCK) remains zero. However, and as described in connection with FIGS. 6A, once the write enable line (WEN) transitions to a low state, the master clock (MCK) transitions from low to high 432 following the next high to low transition 424 of the clock signal 428. When the master clock (MCK) signal transitions from low to high, it causes the RS flip-flop 418 to set, which places a zero on the inverted output that is directed to the D1 input of latch 420. As a result, the inverted output of latch 420 transitions from zero to one at the next negative going edge 440 of the clock signal 428. Therefore, a logic one signal will be placed at one input of AND gate 416. Thus, at the next low to high transition 442 of the clock signal (CK) the output of the AND gate 416 will transition from low to high, thereby pulsing, the slave clock signal (SCK). As described above, the low to high transition on the (SCK) signal propagates the data through the latch 412 to the output of the buffer. As illustrated in the timing diagram of FIG. 6B, this low to high transition of the (SCK) clock occurs precisely two clock cycles after the right enable signal (WEN) transitions from high to low.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A multi-mode buffer for a digital signal processor comprising:
   a clock input;
   a data input;
   a control input;
   an output;
   means for delivering data on the data input to the output in response to the clock input; and
   means responsive to the control input to vary a delay in delivering the data input to the output.

2. The apparatus as defined in claim 1, wherein the control input is a one bit input.

3. The apparatus as defined in claim 2, the means responsive to the control input is configured such that when the control input is a logic zero, the data at the data input is delivered to the output in response to the next clock transition.

4. The apparatus as defined in claim 2, the means responsive to the control input is configured such that when the control input is a logic one, the data at the data input is delayed at least one clock transition before being delivered to the output.

5. The apparatus as defined in claim 2, the means responsive to the control input is configured such that when the control input is a logic one, the data at the data input is delivered to the output in response to the next clock transition.

6. The apparatus as defined in claim 2, the means responsive to the control input is configured such that when the control input is a logic zero, the data at the data input is delayed at least one clock transition before being delivered to the output.

7. The apparatus as defined in claim 1, further including means for inverting the data input before delivering it to the output.

8. The apparatus as defined in claim 1, wherein the means for delivering data includes at least two latches.

9. The apparatus as defined in claim 1, further including a write enable input.

10. The apparatus as defined in claim 9, further including means for disabling the operation of the buffer in response to the state of the write enable input.

11. A multi-mode buffer for a digital signal processor comprising:
    a clock input;
    a data input;
    a control input;
    an output;
    circuitry configured to deliver data on the data input to the output in response to the clock input; and
    circuitry responsive to the control input to vary a delay in delivering the data input to the output.

12. An integrated circuit configured for digital signal processing comprising:
    a memory;
    at least two multi-mode buffers disposed in communication with the memory, each of the multi-mode buffers receiving a control signal and having circuitry configured to deliver data values on an input to an output in response to a clock signal;
    a multiplier configured to multiply data values output from the at least two multi-mode buffers;
    a controller configured to control a state of the control signal delivered to each of the at least two multi-mode buffers; and
    circuitry within each of the at least two multi-mode buffers to variably delay the delivery of the input to the output in response to the value of the control signal.

13. The apparatus as defined in claim 12, further including an and adder configured to sum the output of the multiplier with previous outputs generated by the multiplier.

14. The apparatus as defined in claim 12, wherein there are four multi-mode buffers.

15. The apparatus as defined in claim 14, wherein the four multi-mode buffers are configured in pairs, wherein one buffer of each pair stores a real component value and the other buffer of each pair stores an imaginary component value.

16. The apparatus as defined in claim 12, wherein each multi-mode buffer includes a control input and circuitry responsive to the control input to vary the delivery of the data delivered to the input to the output by at least one clock transition.

17. The apparatus as defined in claim 12, wherein the memory is configured to store both data values and coefficient values that are to be processed by the digital signal processor.

18. A multi-mode buffer for a digital signal processor comprising:
    a clock input;
    a data input;
    a control input;
    an output;
    a first data path interposed between the data input and the data output, the first data path comprising at least two series connected flip-flops;
    a second data path interposed between the data input and the data output, the second data path being disposed in parallel to the first data path and comprising at least one flip-flop; and
    a multiplexer being controlled by the control input to selectively control the delivery of data input to the data input through the first and second data paths, wherein delivery through the first data path will result in a delay of at least two clock cycles and delivery through the second data path will result in a delay of at least one clock cycle.

* * * * *